(12) United States Patent
Krull et al.

(10) Patent No.: US 6,459,987 B1
(45) Date of Patent: Oct. 1, 2002

(54) METHOD AND APPARATUS FOR BACKTRACKING A PATH

(75) Inventors: Jay Dee Krull, Olathe, KS (US); Darin J. Beesley, Kansas City, MO (US)

(73) Assignee: Garmin Corporation (TW)

( * ) Notice: Subject to any disclaimer, the term of this patent is extended or adjusted under 35 U.S.C. 154(b) by 578 days.

(21) Appl. No.: 08/751,125

(22) Filed: Nov. 15, 1996

(51) Int. Cl.[7] .................................................. G06G 7/78
(52) U.S. Cl. ........................ 701/213; 701/200; 701/201; 701/207; 701/205
(58) Field of Search .................................. 701/200, 201, 701/202, 207, 208, 209, 213, 211, 214; 340/988, 990, 995; 342/357, 451, 457

(56) References Cited

U.S. PATENT DOCUMENTS

| | | | |
|---|---|---|---|
| 4,203,070 A | 5/1980 | Bowles | 375/317 |
| 4,380,745 A | 4/1983 | Barlow | 331/176 |
| 4,774,671 A * | 9/1988 | Itoh et al. | 701/208 |
| 4,774,672 A * | 9/1988 | Tsunoda et al. | 701/208 |
| 4,899,285 A * | 2/1990 | Nakayama et al. | 701/220 |
| 4,921,467 A | 5/1990 | Lax | 455/264 |
| 4,939,663 A * | 7/1990 | Baird | 701/208 |

(List continued on next page.)

OTHER PUBLICATIONS

Robert Brainerd McMaster, Automated Line Generalization, Summer 1987, Vol. 24, #2.

Hans J. Weiss, Relating to the Efficiency of Utilization of the Geostationary Orbit/Spectrum in the Fixed–Satellite Service, Proceedings of the IEEE, Vol. 68, #12.

Wlodzimierz Lewandowski and Claudine Thomas, GPS Time Transfer, Jul. 1991, Vol. 79, #7.

Raymond Pickholtz, Theory of Spread–Spectrum Communications–A Tutorial, May 1982, IEEE Trans. Communications, Volume Com–30.

Jack Lane, Geophysical Applications, IEEE, pp. 55.2.1–55.3.7.

Roger McLean, An Advanced Microprocessor–Controlled GPS Time Transfer System, pp. 142–148.

Phil Ward, An Advanced Navstar GPS Multiplex Receiver, pp. 51–59.

John Murphy, Collins Avionics Navstar GPS Advanced Digital Receiver, pp. 107–117.

*Primary Examiner*—Jacques H. Louis-Jacques
(74) *Attorney, Agent, or Firm*—Devon A. Rolf

(57) ABSTRACT

A method for automatically generating a point-reduced backtrack route is provided, using the aid of Global Positioning System technology. The method begins by recording a potentially very large series of data points using GPS technology and a user-selected point recording algorithm into a forward-track route. A point-reducing algorithm is then used to reduce the forward track to a backtrack route which preserves the topological essence of the original route, but with far fewer data points. This reduced backtrack route is then suitable for storage in a memory constrained device, and is suitable for backtrack navigation without the need for the large set of original route points. Storage of a number of such backtrack routes is thus made available to the end user.

16 Claims, 4 Drawing Sheets

U.S. PATENT DOCUMENTS

| | | | |
|---|---|---|---|
| 4,982,332 A | * 1/1991 | Saito et al. | 701/208 |
| 5,003,306 A | * 3/1991 | Takahashi et al. | 701/208 |
| 5,081,431 A | 1/1992 | Kubo | 331/158 |
| 5,087,919 A | * 2/1992 | Odagawa et al. | 701/217 |
| 5,087,969 A | * 2/1992 | Kamada et al. | 701/28 |
| 5,172,075 A | 12/1992 | Yerbury | 331/14 |
| 5,204,817 A | 4/1993 | Yoshida | 701/209 |
| 5,225,842 A | 7/1993 | Brown | 342/357 |
| 5,297,051 A | 3/1994 | Arakawa | 701/200 |
| 5,311,339 A | 5/1994 | Fertig | 349/76 |
| 5,323,164 A | 6/1994 | Endo | 342/357 |
| 5,392,005 A | 2/1995 | Bortolini | 331/44 |
| 5,434,789 A | 7/1995 | Fraker | 701/300 |
| D363,488 S | 10/1995 | Shumaker | D14/230 |
| D365,032 S | 12/1995 | Laverick | D10/78 |
| D365,292 S | 12/1995 | Laverick | D10/78 |
| 5,475,599 A | * 12/1995 | Yokoyama et al. | 701/211 |
| 5,502,640 A | * 3/1996 | Yagyu et al. | 701/200 |
| 5,543,802 A | 8/1996 | Villevieille et al. | 342/357 |
| 5,717,389 A | * 2/1998 | Mertens et al. | 701/213 |
| 5,774,362 A | * 6/1998 | Suzuki et al. | 701/208 |
| 5,787,382 A | * 7/1998 | Kurabayashi | 701/214 |

\* cited by examiner

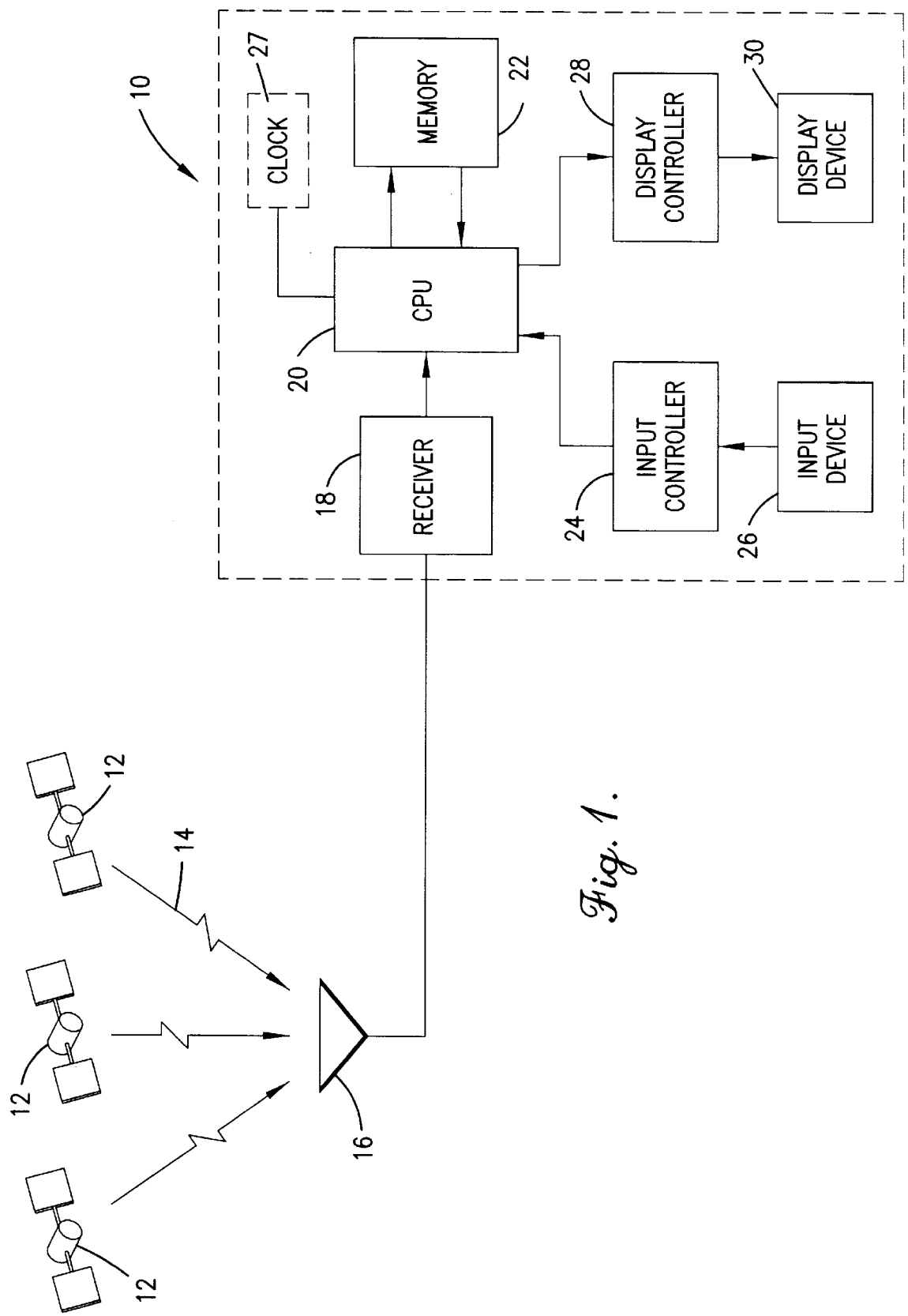

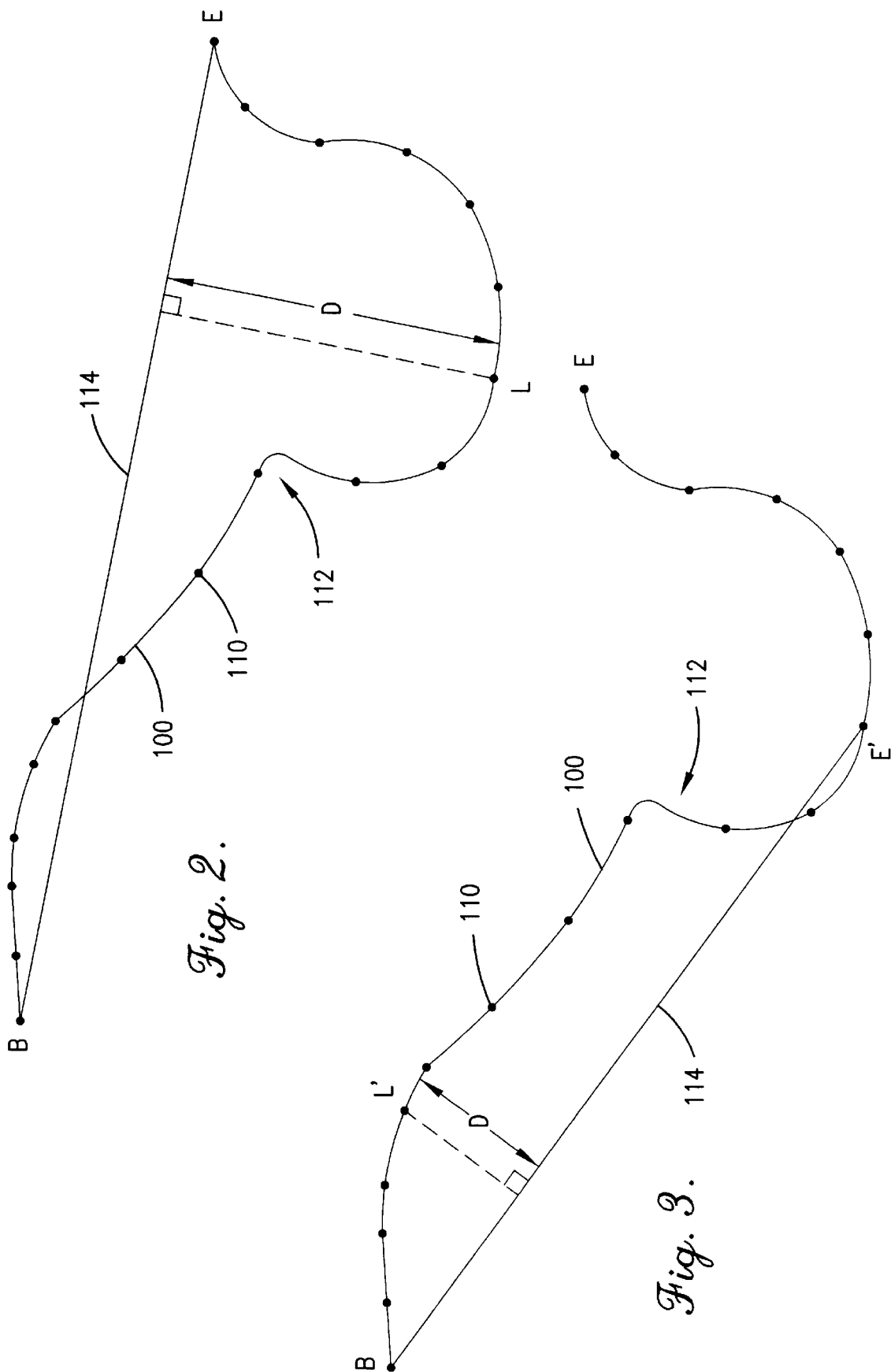

METHOD AND APPARATUS FOR BACKTRACKING A PATH

FIELD OF INVENTION

The present invention relates generally to navigation, and more particularly to equipment and a method for finding ones way back along a path that has been traversed while using navigational equipment.

DESCRIPTION OF THE PRIOR ART

With the reduction in cost for consumer electronic equipment an increasing number of Global Positioning Systems (GPS) have become available. These devices have gone from being an electronic gadget to being a heavily relied upon device for determining position as well as direction and distance to a destination. Likewise, the reliance on these devices have also increased. Currently, there are a number of GPS systems. For example, Garmin International produces hand held GPS units which may be used by small boaters and even hikers. An example of such a unit is described in the GPS 38 "Personal Navigator"™ Owner's Manual published in 1996.

A desirable feature of existing GPS systems is the ability to provide information about where the user is and how to get to a predetermined point known as a way-point. This feature is generally accomplished by the GPS system computing a straight line between the way-point and the current location. The system also provides direction and distance information associated with this straight line. This feature has allowed users greater freedom in their travel.

Unfortunately, this feature has drawbacks. For example, there may be an impassable object between the user and the way-point. In this situation, the user would continue along the straight line path until the impassable object is encountered. While this presents a minor nuisance during the daytime, it may present a hazardous situation at night, during low visibility or during inclement weather. To date, there are no GPS systems which may predict the existence of an impassable object in an untraveled path. While this is understandable, it is not acceptable that these GPS systems are not able to avoid these impassable objects on a return path.

Currently, the applicant is not aware of any system which is capable of providing a return path which accurately takes into consideration the entire path traveled by the user. Generally, this is because of the memory and computational limitations present in today's GPS systems. For example, to accurately map a path, the number of data points would vary with the number of times the path meanders from a straight line. The data associated with a detour around an impassable object would greatly reduce the distance of a path one would be able to store in memory. Additionally, even if one would store every minute detail of a path, the user would not want to know about each minor change in path stored and replayed. Therefore, a need exists for a system that is capable of backtracking or retracing one's steps in order to avoid dangerous or impassable objects while being able to ignore minor deviations in the traversed path.

SUMMARY OF THE INVENTION

A method for automatically generating a point-reduced backtrack route is provided, using the aid of Global Positioning System technology. The method begins by recording a potentially very large series of data points using GPS technology and a user-selected point recording algorithm into a forward-track route. A point-reducing algorithm is then used to reduce the forward track to a backtrack route which preserves the topological essence of the original route, but with far fewer data points. This reduced backtrack route is then suitable for storage in a memory constrained device, and is suitable for backtrack navigation without the need for the large set of original route points. Storage of a number of such backtrack routes is thus made available to the end user.

It is therefore an object of the present invention to provide a GPS system which will provide a means for backtracking a path that has been traveled.

It is a further object to provide a GPS system which reduces the amount of memory and computational power required to process a return path based upon a traveled path.

It is yet another object to provide a GPS system which generates an accurate retrace of an originally traveled path.

It is yet another object to provide a means to avoid dangerous and impassable objects which were encountered on the original path.

It is yet another object to provide a means for storing the original path data in a manner which utilizes less memory.

It is yet another object to provide a means for storing original path data when the GPS system is in a non-steady state.

It is yet another object to provide a means for storing the original path data which compares the current location to previous locations and determines if it is necessary to store the current data point.

In all of the above embodiments, it is an object to provide a safe, reliable and inexpensive GPS system which accurately retraces a path that has been traveled by the user.

Finally, it is an object of the invention to provide a method of accomplishing a backtrack of a path which may be implemented in existing GPS systems.

According to one broad aspect of the present invention, there is provided a method for generating a backtrack from a plurality of data points which have been stored in a memory of a Global Positioning System, the data points having a first, last and intermediate data points corresponding to geographic position, the method comprising the steps of: initializing a counter C to a value of 1, the counter C corresponding to a memory location on a memory stack; storing the last data point in the memory stack at a first memory location; assigning the last data point to a variable E; initializing a stack counter N to a value of 2; assigning the first data points to a variable B; comparing the counter C to zero.

And conducting the following steps if the counter C is greater than zero: computing a straight line from the variable B to the variable E; computing a shortest distance for each of the intermediate data points from the straight line, thereby having a plurality of shortest distances corresponding in a one to one relationship to the intermediate data points; determining the longest of each of the shortest distances and assigning the intermediate data point corresponding to the longest distance to a variable L and assigning the longest distance to a variable D; comparing the variable D to a threshold value; increasing the value of counter N by one, storing the variable L in the memory stack at memory location S(C), assigning the value of variable L to variable E, and returning to the comparing of the counter C to zero step; if D is greater than the threshold value; decreasing the value of counter C by one, assigning the value of variable E to variable B and assigning the value of stack memory location S(c−1) to variable E, and returning the comparing C to zero step; if D is less than or equal to the threshold value.

And conducting the following steps if variable C is less than or equal to zero: comparing N to a predetermined memory limit; increasing the threshold value by a predetermined value, and returning to initializing a counter C step; is N is greater than the memory limit; and navigating to the first position utilizing the positions stored in the stack as way-points for the global positioning system.

According to another broad aspect of the invention, there is provided a method for storing data points in a memory of a Global Positioning System, the method comprises the steps of: acquiring a first data point corresponding to a first geographic position; storing the first data point in the memory; acquiring a second data point corresponding to a second geographic position; storing the second data point in the memory; acquiring a current data point to the second data point; computing the shortest distance from the current data point and the line; comparing the shortest distance to a threshold value; discarding the current data point if the shortest distance is less than the threshold value; and storing the current data point in the memory if the shortest distance is greater than or equal to the threshold value.

Other objects and features of the present invention will be apparent form the following detailed description of the preferred embodiment.

BRIEF DESCRIPTION OF THE DRAWINGS

The invention will be described in conjunction with the accompanying drawings, in which:

FIG. 1 is a block diagram illustrating a GPS system constructed in accordance with the preferred iteration of the invention:

FIG. 2 is an illustration of a path which has been traversed and illustrates a first iteration of the inventive method of backtracking the traversed path;

FIG. 3 is an illustration of the path of FIG. 2 which illustrates a second embodiment of the inventive method;

DETAILED DESCRIPTION OF THE PREFERRED EMBODIMENT

Figures 4, 5:
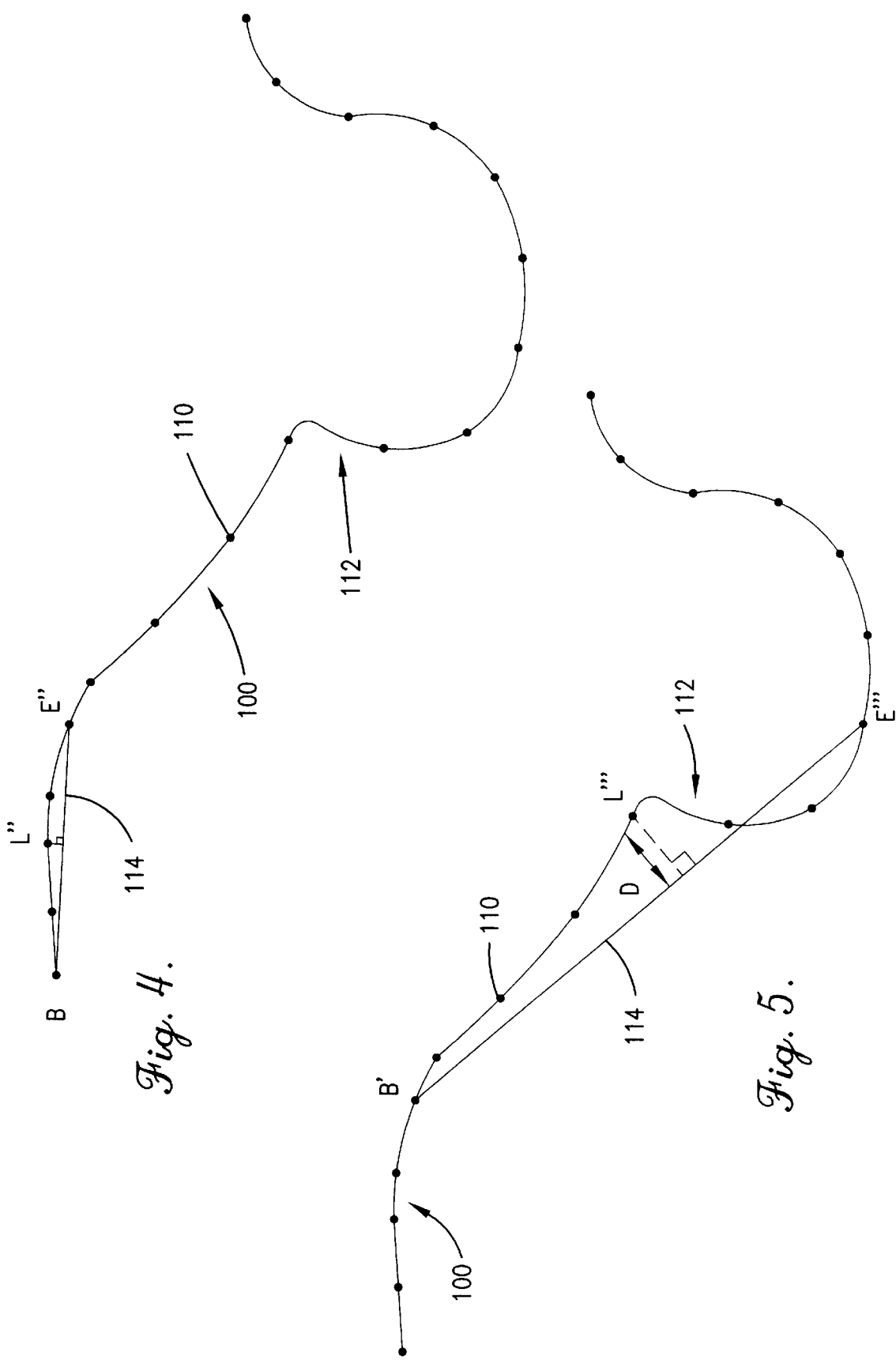
FIG. 4 is an illustration of the path of FIG. 2 which illustrates a third iteration of the inventive method.
FIG. 5 is an illustration of the path of FIG. 2 which illustrates a fourth iteration of the inventive method.

With reference to the Figures, wherein like references characters indicate like elements throughout the several views and, in particular, with reference to FIG. 1, a GPS systems, generally refereed to as element 10, is illustrated. As may be seen, satellites 12 are provided for generating a signal 14 which is received by an antenna 16. For illustrative purposes, three satellites 12 have been provided. It should be appreciated that any number of satellites 12 may be present and that by having three satellites 12 GPS system 10 may perform a triangulation, using signals 14 to determine its exact position. Signal 14 is conveyed to receiver 18 by antenna 16. Signal 14 is then processed by a central processing unit (CPU) 20. As may be seen, CPU 20 has bidirectional communication with memory 22. In this manner, CPU may store and retrieve information for memory 22. CPU 20 may also be used for manipulating data stored in memory 22 for display on display device 30. A conventional display controller 28 is provided for controlling display 30. Information may also be provided to CPU 20 via an input device 26. As may be seen, a conventional input controller 24 is provided for controlling input device 26. It should be appreciated that input and display controllers 24, 28 may be incorporated into CPU 20 by software routines.

In operation, a user walks along a path 100 as is illustrated in FIG. 2. As may be seen in that Figure, a radical change has occurred in path 100 at point 112. This may be due to an impassable object, a dangerous region or a desire to explore in a particular region. As discussed above, it would be desirable to have system 10 remember that there was a radical change in path 100 so that when backtracking or retracing along path 100, this information may be preserved without overloading memory 22 of system 10.

To accomplish this accurate backtracking or retracing, it is essential that GPS system 10 stores intermediate data points 110 in memory 22. These intermediate data points 110 are associated with a particular position scheme such as latitude/longitude or any other position scheme known in the navigation art. These data points are only limited by the amount of available memory 22 in system 10 and by the data collection rules employed by system 10. For convenience, only a few intermediate data points 110 have been illustrated. As would be expected, the user would activate system 10 at the beginning of path 100 which is marked by reference letter B. At the end of path 100, the user would activate the backtrack method disclosed below. This point is indicated by reference letter E.

The intermediate data points 110 may be stored at predetermined time intervals by having optional clock 27 trigger CPU 20 to store the current location in to memory 22. Finally, an optimizing routine may be used to store points when system 10 is in a non-steady state. For example, if system 10 looks at the last two points stored in memory 22, system 10 would be able to draw an imaginary line extending from these two intermediate data points 110. Next, a determination could be made as to the shortest distance between this imaginary line and the current data point 100, i.e., lying on a line perpendicular to the imaginary line. If this distance is below a particular threshold, then system 10 would not store the current data point 110 in memory 22, i.e., system 10 is still in steady state. If this distance is above the threshold, then the current data point 110 would be stored and used at a later time, i.e., system 10 is no longer in a steady state. In this manner, the distance along path 100 that may be stored is greatly increased since only non-steady state data points 110 are stored. The threshold value may be entered by the user via input device 26 or is a predetermined value based on an user and/or market requirements.

It should be appreciated the above methods for storing data may be combined or used individually. The method used for storing data-points 100 does not effect the method for generating a retrace of path 100 provided that enough points have been stored to sufficiently retrace the path based on end use and/or market requirements.

Figure 6:
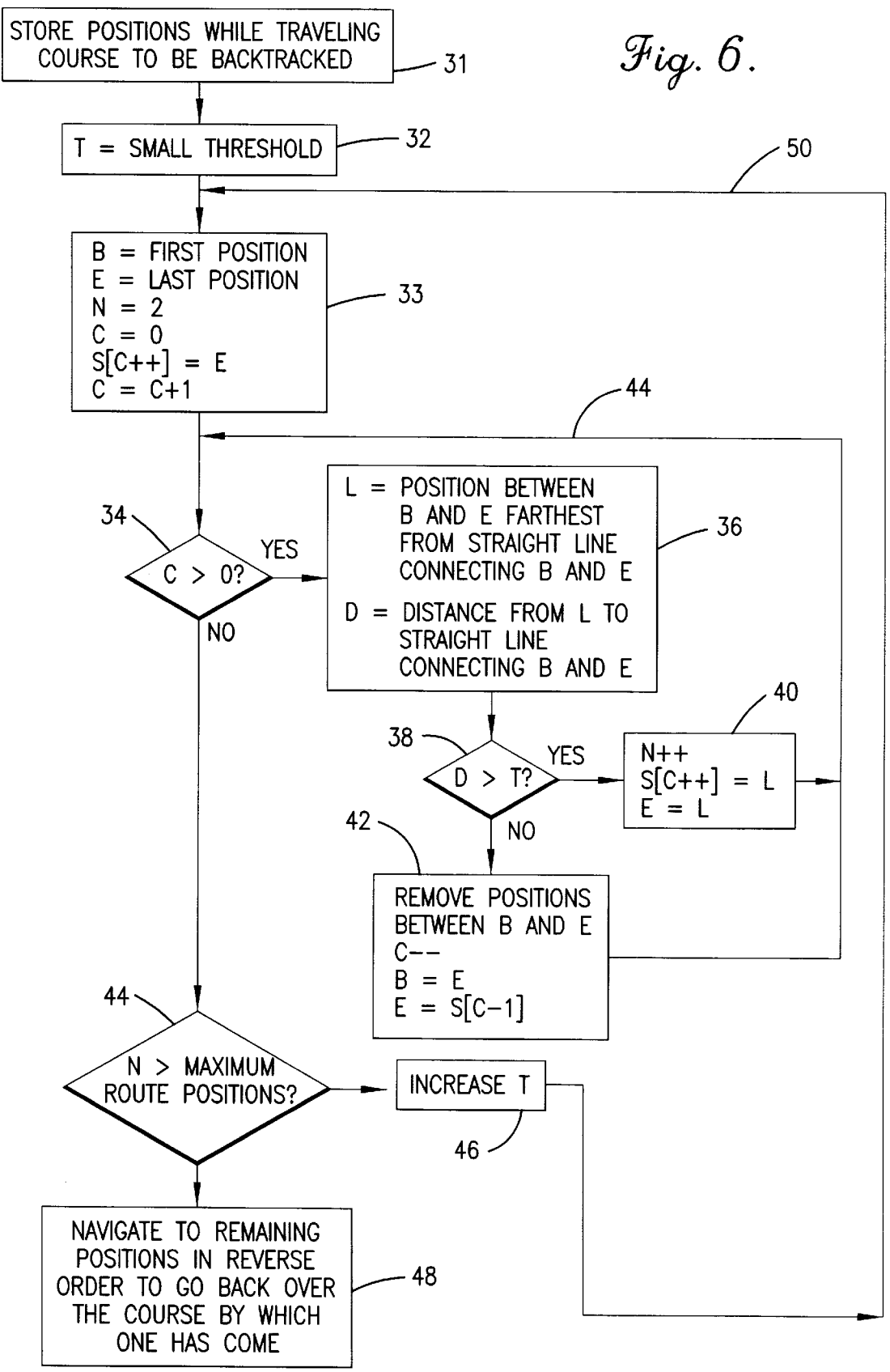
FIG. 6 is a flow chart which outlines the logic flow of the inventive method.

Turning now to FIG. 6, a flow chart of the inventive retrace method is provided. This flow chart will be described inconjunctin with FIGS. 2, 3, 4 and 5 which illustrate the effect of the logic states of the flow chart on a path 100 which has been traversed.

As may be seen in FIG. 6, block 31 represents the storing of data points as discussed above. Next, system 10 must initialize itself for conducting a retrace or backtrack of the traversed path 100. The first part of this initialization process comprises setting particular global variables. As may be seen by block 32, the first variable to be set is T. This variable T, represents an acceptable threshold error, i.e., the amount of error allowed from the original course. This variable is used for determining whether to keep or discard a data point. The initial value for T may be input by the user via input device 26 or may be a predetermined value stored in memory 22 keeping in mind that T is variable.

Next, the operating variables are initialized. This is process is indicated by block 33. As may be seen, the variables, B, E, N, C and S are established with initial values. It should be appreciated that B represents the first data point for path 100 and E represents the last data point for path 100. It should be appreciated that B and E are variables which contain position information such as latitude and longitude for each point. Any other geometry system may be utilized to represent positional information. N represents the number of backtrack data points currently in use. N is initialized to two (2) to indicate that points B and E are to be used for the backtrack or retrace. C is a counter for stack S and is initialized to zero. S represents a memory stack which may be stored in memory 22 or any other memory location. S is initialized to have the last position stored on the stack, i.e., the value for E is stored in S(0). Finally, the value for C is increased by 1.

Now that the initialization stage has been completed, system 10 may begin to evaluate the data points for inclusion in the stack S. The first step to is to determine whether C is greater than zero as indicate by decision diamond 34. As may be seen, there are two logic states from decision diamond 34, if C is greater than zero then, box 36 is reached. If C is less than or equal to zero, then decision diamond 44 is reached. For clarity, the branch associated with decision diamond 44 will be explored first.

Decision diamond 44 represents whether the number of backtrack data points exceeds system 10 limits. In a preferred embodiment the data point system limit will be determined by the marketing requirements. In the event that N is less than system 10 limit, then the points stored in stack S are used for navigation as indicated by block 48. The data points in stack S are used in reverse order so that one may go back over the course by which one has come. In the event that N is greater than system 10 limit, then T is increased as indicated by block 46. This increase may be by a predetermined value or may be provided for by the user via input device 26. After T is increased, the logic flow is jumped back before block 33.

Returning now to the positive result from decision diamond 34, block 36 is reached. CPU 20 computes a straight line 114 between points B and E. Next, the variable L is defined to be the data point which is the farthest distance from line 114. Finally, a variable D is defined to be the shortest distance point L is from line 114. This process is graphically illustrated in FIGS. 2, 3, 4 and 5.

Next, decision diamond 38 is reached. In diamond 38, D is compared to T, i.e., is the data point L above the tolerance level for error. If D is greater than T, the data point is far enough way that it may not be discarded without adversely affecting the backtrack route. Therefore, if the result is yes, then the logic flows to block 40. In this event, the data point stored in L is added to stack S. This is accomplished by defining the stack position S(C) to be equal to L. The variable N is increased by one to indicate that L has been added to stack S. Finally, the variable E is redefined to be L. Thus, the new end point is the last point stored in L. This situation is illustrated in FIG. 3 where E represents the last L (this is also illustrated in FIG. 4 for the next iteration). After the variable update is accomplished, the logic flow is jumped back before decision diamond 34. For convenience, primes have been added to the drawings to indicate what iteration the particular variable is in. For example, a single prime indicates that the variable has been through one iteration.

If D is less than or equal to T, all data points strictly between B and E may be discarded without adversely affecting the backtrack route. This situation is illustrated in FIG. 4 by the point L. In this event, the logic will flow to block 42. This block 42 is illustrative of the following steps. First, since the point L is not needed for accurate backtracking, it will not be stored in stack S. To prevent L from being stored, counter C decremented by one. Next, the variable B is set to the current value of E. This is illustrated in FIG. 5 as B'. Finally, the value of E is set to the location stored in stack S(c−1). This is illustrated in FIG. 5 as E. After this, the logic flow is jumped back before decision diamond 34.

This process is repeated until there is a negative result from decision diamond 44. In that event, the backtracking may be accomplished by using the points in stack S as conventional way-points for system 10.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

We claim:

1. A method for generating a backtrack from a plurality of data points which have been stored in a memory of a Global Positioning System, said data points having a first, last and intermediate data points corresponding to geographic positions, the method comprising the steps of:

initializing a counter C to a value of 1, said counter C corresponding to a memory location on a memory stack;

storing said last data point in said memory stack at a first memory location;

assigning said last data point to a variable E;

initializing a stack counter N to a value of 2;

assigning said first data point to a variable B;

comparing said counter C to zero;

conducting the following steps if said counter C is greater than zero:

computing a straight line from said variable B to said variable E;

computing a shortest distance for each of said intermediate data points from said straight line, thereby having a plurality of shortest distances corresponding in a one to one relationship to said intermediate data points;

determining the longest of each of said shortest distances and assigning said intermediate data point corresponding to said longest distance to a variable L and assigning said longest distance to a variable D;

comparing said variable D to a threshold value;

increasing the value of counter N by one, storing said variable L in said memory stack at memory location S(C), assigning the value of variable L to variable E, and returning to said comparing said counter C to zero step; if D is greater than said threshold value;

decreasing the value of counter C by one, assigning the value of variable E to variable B and assigning the value of stack memory location S(c−1) to variable E, and returning to said comparing said counter C to zero step; if D is less than or equal to said threshold value;

conducting the following steps if variable C is less than or equal to zero;

comparing N to a predetermined memory limit;

increasing said threshold value by a predetermined value, and returning to initializing a counter C step; if N is greater than said memory limit; and navigating to said first position utilizing said positions stored in said stack as way-points for said global positioning system.

2. The method recited in claim 1, wherein said threshold value is entered by a user in an input device to said global positioning system.

3. The method recited in claim 1, wherein said shortest distance is computed by: computing a plurality of line perpendicular to said straight line and intersecting each of said intermediate data points, and computing the distance of each of said perpendicular lines between an intersection of said straight line each respective intermediate data point.

4. The method recited in claim 1, wherein said intermediate data points are stored at predetermined time intervals.

5. The method recited in claim 1, wherein said intermediate data points are entered by a user in an input device to said global positioning system.

6. The method recited in claim 1, wherein said intermediate data points are stored by:

acquiring a first data point corresponding to a first geographic position;

storing a first data point corresponding in said memory;

acquiring a second data point corresponding to a second geographic position;

storing said second data point in said memory;

acquiring a current data point corresponding to a current geographic position;

computing a straight line from said first data point to said second data point;

computing the shortest distance from said current data point and said line;

comparing said shortest distance to a threshold value;

discarding said current data point if said shortest distance is less than said threshold value; and storing said current data point in said memory if said shortest distance is greater than or equal to said threshold value.

7. A method for generating a backtrack path from a set of data points stored in a memory of a global positioning system device, said data points corresponding to geographic positions on a forward path, said method comprising:

selecting a subset of said set of data points; and storing said subset of data points in said memory as the backtrack path.

8. The method as set forth in claim 7, wherein said set of data points includes a first data point corresponding to a beginning of the forward path and a last data point corresponding to an end of said forward path, said method further comprising:

computing a straight line between said beginning and said end of said forward path, wherein said step of selecting a subset of said data points is a function of the distance from the geographical position corresponding to each said data point and said computed straight line.

9. A global positioning system receiver device comprising:

memory having stored therein a set of data points, each said data point of said set corresponding to a geographic position on a forward path; and a processor, connected to said memory, for computing a backtrack path by selecting a subset of said data points of said set.

10. The global positioning system receiver device as set forth in claim 9, wherein said subset of data points comprises at least one less data point than is comprised in said set of data points.

11. The global positioning system receiver device as set forth in claim 9, wherein said set of data points includes a first data point corresponding to a beginning of the forward path and a last data point corresponding to an end of said forward path, and wherein said processor determines when to include each data point of said set in said subset of data points based upon a distance from the geographic position represented by the data point and a computed straight line between said beginning and said end of said forward path.

12. A method for generating a backtrack path from a set of data points stored in a memory of a global positioning system device, said data points corresponding to geographic positions on a forward path, said method comprising:

automatically selecting a subset of said set of data points; and automatically storing said subset of data points in said memory as the backtrack path.

13. The method as set forth in claim 12, wherein said set of data points includes a first data point corresponding to a beginning of the forward path and a last data point corresponding to an end of said forward path, said method further comprising:

computing a straight line between said beginning and said end of said forward path, wherein said step of selecting a subset of said data points is a function of the distance from the geographical position corresponding to each said data point and said computed straight line.

14. A global positioning system receiver device comprising:

a memory having stored therein a set of data points, each said data point of said set corresponding to a geographic position on a forward path; and a processor, connected to said memory, for automatically computing a backtrack path by selecting a subset of said data points of said set.

15. The global positioning system receiver device as set forth in claim 14, wherein said subset of data points comprises at least one less data point than is comprised in said set of data points.

16. The global positioning system receiver device as set forth in claim 14, wherein said set of data points includes a first data point corresponding to a beginning of the forward path and a last data point corresponding to an end of said forward path, and wherein said processor determines when to include each data point of said set in said subset of data points based upon a distance from the geographical position represented by the data point and a computed straight line between said beginning and said end of said forward path.

* * * * *